US012748411B2

(12) United States Patent
Luo et al.

(10) Patent No.: US 12,748,411 B2
(45) Date of Patent: Sep. 29, 2026

(54) EMPLOYING A BATCH MODEL IN ROOT CAUSE ANALYSIS OF INDUSTRIAL BATCH PERFORMANCE ANALYTICS

(71) Applicant: Rockwell Automation Technologies, Inc., Mayfield Heights, OH (US)

(72) Inventors: Dennis J. Luo, Germantown, WI (US); Meiling He, Shorewood, WI (US); Justice Darko, Charlotte, NC (US); Ishit Patni, Pune (IN); Fatime Ly Seymour, Charlotte, NC (US); Francisco P. Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 394 days.

(21) Appl. No.: 18/503,866

(22) Filed: Nov. 7, 2023

(65) Prior Publication Data

US 2025/0147501 A1 May 8, 2025

(51) Int. Cl.
*G05B 23/00* (2006.01)
*G05B 23/02* (2006.01)

(52) U.S. Cl.
CPC ....... *G05B 23/0224* (2013.01); *G05B 23/027* (2013.01)

(58) Field of Classification Search
CPC ................................ G05B 23/00; G06Q 10/06
See application file for complete search history.

(56) References Cited

U.S. PATENT DOCUMENTS

2016/0274552 A1* 9/2016 Strohmenger .......... G06Q 10/06
2017/0177754 A1* 6/2017 Jin ..................... G05B 19/4184
2020/0004229 A1* 1/2020 Hosoya .............. G05B 19/4185
2021/0026334 A1* 1/2021 Mazur ................ G05B 13/0265
2023/0267368 A1* 8/2023 Paulitsch ........... G05B 23/0254 706/12
2023/0304937 A1* 9/2023 Venkatarayalu ....... G01N 21/77
2024/0142936 A1* 5/2024 Jun .................... G05B 13/0265
2024/0354684 A1* 10/2024 Hallihole ........... G05B 23/0286

OTHER PUBLICATIONS

Champagne, et al., Optimizing valve actuator parameters to enhance control valve performance, ISA Transactions, vol. 35, No. 3, 1996, pp. 217-223 (Year: 1996).*

* cited by examiner

*Primary Examiner* — Daniel Vetter
(74) *Attorney, Agent, or Firm* — Fletcher Yoder, P.C.

(57) ABSTRACT

A method may include receiving, via a processing system, a selection of a first dataset associated with one or more operations of one or more industrial automation components of an industrial system that may perform a batch operation. The method may involve generating an optimized dataset based on the dataset, receiving a second dataset associated with one or more additional operations of one or more additional industrial automation components of an additional industrial system that may perform an additional batch operation, and determining one or more deviations between the optimized dataset and the second dataset. The method may also involve determining a contribution of each of a set of parameters to the one or more deviations and generating a visualization representative of the contribution of each of a set of parameters to the deviation.

20 Claims, 9 Drawing Sheets

EMPLOYING A BATCH MODEL IN ROOT CAUSE ANALYSIS OF INDUSTRIAL BATCH PERFORMANCE ANALYTICS

CROSS-REFERENCE TO RELATED APPLICATION

This application is related to U.S. patent application Ser. No. 18/503,898, entitled "Root Cause Analysis Framework in Industrial Process Analytics," and U.S. patent application Ser. No. 18/503,913 entitled "Integrated Generative AI Framework for Analytics Using HMI Assistance," each of which is herein incorporated by reference in their entirety for all purposes.

BACKGROUND

This disclosure generally relates to industrial automation systems and, more particularly, to providing a root cause analysis framework for analyzing industrial process data.

In industrial automation systems, anomalies, faults, and other errors may occur for a number of reasons. However, traditional methods for performing root cause analysis to identify causes for these issues may prove to be challenging with respect to time to resolve the issues and the number of resources employed in the processes. With this in mind, it may be beneficial to leverage data provided by industrial devices (e.g., operational technology (OT) devices) to perform more efficient data analytics to perform root cause analysis in a consistent manner.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a method may include receiving, via a processing system, a selection of a first dataset associated with one or more operations of one or more industrial automation components of an industrial system that may perform a batch operation. The method may involve generating an optimized dataset based on the dataset, receiving a second dataset associated with one or more additional operations of one or more additional industrial automation components of an additional industrial system that may perform an additional batch operation, and determining one or more deviations between the optimized dataset and the second dataset. The method may also involve determining a contribution of each of a set of parameters to the one or more deviations and generating a visualization representative of the contribution of each of a set of parameters to the deviation.

BRIEF DESCRIPTION OF THE DRA WINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
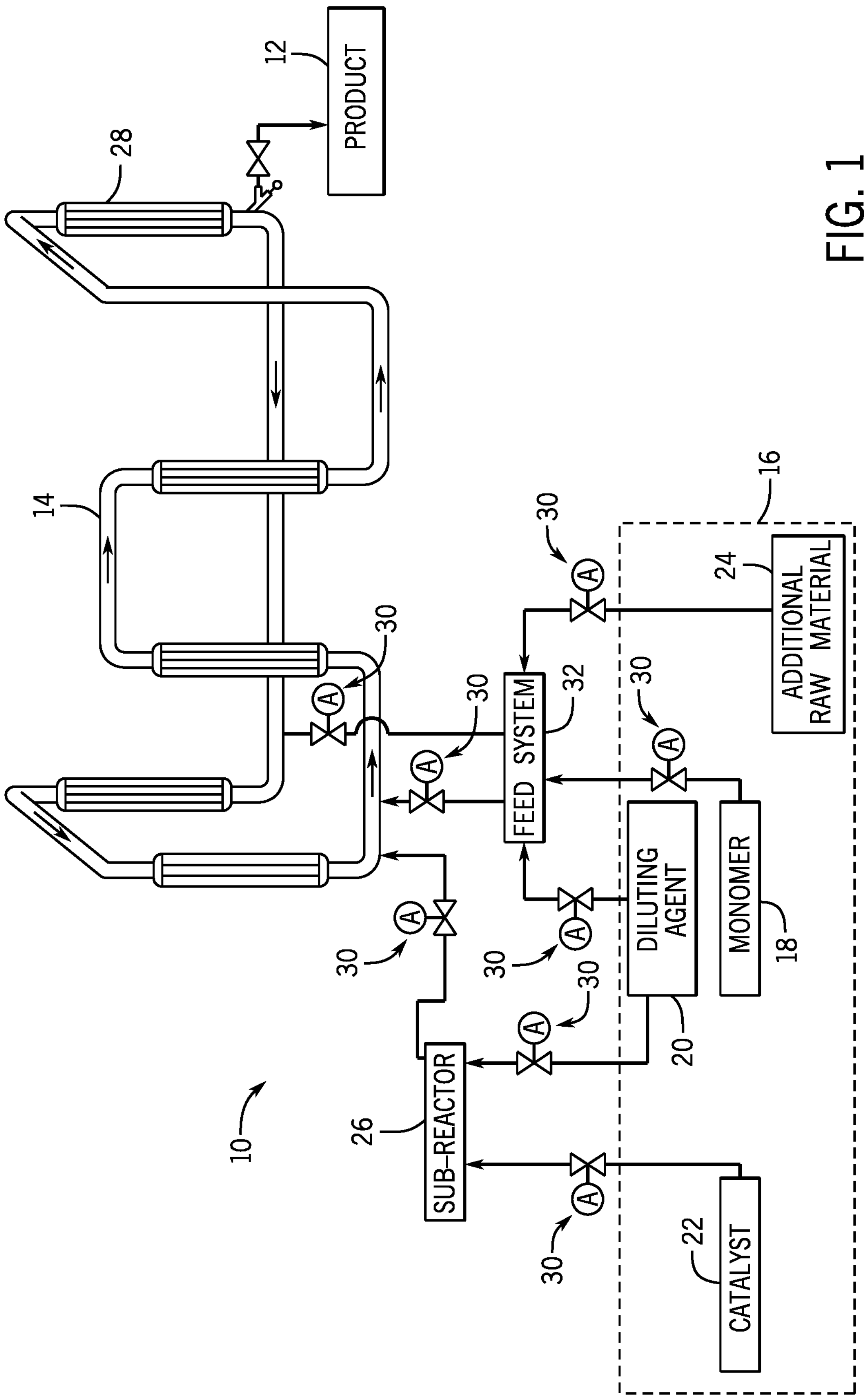
FIG. 1 is a diagrammatic representation of an example petrochemical-related process, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is related to a batch optimizer system may employ a particular batch model (e.g., reference batch model) to automatically perform some root cause analysis processes to reduce a time to identifying possible root cause sources. The reference (e.g., golden) batch G may be identified or designated as a batch in which other batches may be compared to. By way of example, the batch optimizer system may receive a selection of a number of datasets for a first set of batches that have been classified as operating under normal operating conditions. With this in mind, batch optimizer system may receive a critical process parameter ($CPP_j$) data for the reference batch as a time series dataset $$G_k^{(j)}$$

(where j is for the $CPP_j$ variable, k is sample time point).

The batch optimizer system may then evaluate the time series dataset $$G_k^{(j)}$$

for various CPPs and determine whether the distribution attributes of each CPP is similar to a normal distribution. If the time series dataset $$G_k^{(j)}$$

distribution is similar to a normal distribution, the batch optimizer system may normalize the time series dataset $$G_k^{(j)}$$

into a normalized time series dataset $$G_k^{(j,norm)}$$

based on a mean (μ) and a standard deviation (σ) of the time series dataset $$G_k^{(j)}.$$

Alternatively, if the time series dataset $$G_k^{(j)}$$

distribution deviates significantly from a normal distribution, the batch optimizer system may employ a min-max scaling algorithm to determine a normalized time series dataset $$G_k^{(j,norm)}$$

based on a minimum and maximum values of the time series dataset $$G_k^{(j)}.$$

The batch optimizer system may then store the normalized reference time series dataset $$G_k^{(j,norm)}$$

for future root cause analysis operations.

After determining the normalized time series dataset $$G_k^{(j,norm)},$$

the batch optimizer system may monitor other batch datasets $$X_k^{(j)}$$

and determine whether there are deviations between a selected batch dataset $$X_k^{(j)}$$

and the reference time series dataset $$G_k^{(j)}$$

for any particular critical process parameter $CPP_j$. In some embodiments, the batch optimizer system may determine a normalized batch dataset $$X_k^{(j,norm)}$$

in a similar manner as described above and compare the normalized batch dataset $$X_k^{(j,norm)}$$

with the normalized reference time series dataset $$G_k^{(j,norm)}.$$

The discrepancies between the normalized batch dataset $$X_k^{(j,norm)}$$

and the normalized reference time series dataset $$G_k^{(j,norm)}$$

may correspond to detected anomalies. The identified times at which the anomalies occur may be analyzed further to identify and determine root causes for the anomalies. Indeed, the deviation of various CPPs for the selected batch dataset $$X_k^{(j)}$$

with respect to the reference time series dataset $$G_k^{(j)}$$

may be analyzed, such that the batch optimizer system may determine a contribution for each CPP to the deviation from the reference time series dataset $$G_k^{(j)}.$$

In this way, the batch optimizer system may determine potential root causes for the anomalies.

In some embodiments, the identified root causes may be stored in a knowledge database or other suitable storage component to allow the batch optimizer system or other suitable root cause analysis system to determine root causes for other similar datasets. Moreover, the stored root causes may be used to enable a generative artificial intelligence (AI) system to provide solutions or propose root causes for other users having similar patterns identified in their respective datasets. As a result, an operator or field engineer may check the deviation to the reference batch to identify the CPPs (Critical Process Parameter) that are identified as top contributors to the deviation. The user may select a CPP to drill down into and gain more information regarding the selected CPP, operational changes to adjust the CPPs, and the like.

After determining root causes based on deviations between the reference batch for critical process parameters (CPPs) and reference batch data, the batch optimizer system may offer recommendations for operators or field engineers to resolve the identified root cause issues. The recommendations may be determined based on previously performed actions to resolve similar issues, user input, machine learning algorithms, and the like. In addition, the batch optimizer system may store the identified root causes and feedback from users in a database, such that the database may provide insights when combined with generative AI. In some embodiments, the batch optimizer may send commands to industrial automation components to adjust operations to enable the batch optimizer system to achieve its goals.

By way of introduction, FIG. 1 is a diagrammatic representation of a petrochemical-related process in which embodiments described below may be implemented. In particular, illustrated is an example reactor system 10, such as a polymerization reactor capable of processing olefin monomers, like ethylene or hexene, to produce homopolymers or co-polymers as products 12. Any suitable reactor may be used, including batch, slurry, gas-phase, solution, high pressure, tubular or autoclave reactors, or any combination thereof. For case of discussion, FIG. 1 refers to a loop reactor 14 for polymerization. However, it should be noted that the discussion set forth below is intended to be applicable, as appropriate, to any petrochemical process, industrial process, manufacturing process, or the like, as a way to provide context to the following discussion of FIGS. 2-10.

Production processes, like the polymerization reactor process shown in FIG. 1, may occur on an ongoing basis as part of a continuous operation to generate products (e.g., product 12). Sometimes a variety of both continuous and batch systems may be employed throughout a production process. Various suppliers may provide reactor feedstocks 16 to the reactor system 10 via pipelines, trucks, cylinders, drums, and so forth. The suppliers may include off-site and/or on-site facilities, including olefin plants, refineries, catalyst plants, on or off-site laboratories, and the like. Examples of possible feedstocks 16 include olefin monomers 18, diluents or diluting agents 20, catalysts 22, and/or other additives. The other feed components, additional raw materials 24, may also be provided to the reactor 14. Feedstocks 16 may change when using different manufacturing processes and/or when manufacturing a different final product. The feedstocks 16 may be stored or processed in any suitable vessel or process, such as in monomer storage and feed tanks, diluent vessels, catalyst tanks, co-catalyst cylinders and tanks, treatment beds like molecular sieve beds and/or aluminum packing, and so forth, prior to or after being received at the reactor system 10. The reactor system 10 may include one type of reactor in a system or multiple reactors of the same or different type, and desired processing conditions in one of the reactors may be different from the operating conditions of the other reactors.

The product 12 may be moved from the reactor system 10 for additional processing, such as to form polymer pellets from the product 12. In general, the product 12, or processed product (e.g., pellets) may be transported to a product load-out area for storage, blending with other products or processed products, and/or loading into railcars, trucks, bags, ships, and so forth, for distribution to customers.

Processes, like the reactor system 10, may receive or process feedstocks 16 at relatively high pressures and/or relatively high temperatures. For example, a hydrogen feedstock may be handled by the reactor system 10 via pipeline at approximately 900-1000 pounds per square inch gauge (psig) at psig at 90-110° F. Furthermore, some products may be generated using highly reactive, unstable, corrosive, or otherwise toxic materials as the feedstock 16 or as intermediate products, such as hydrogen sulfide, pure oxygen, or the like. Heat, pressure, and other operating parameters may be employed appropriately to obtain appropriate reaction conditions, which may increase a reactivity, instability, or corrosive nature of the feedstock 16. These materials may be desired to be processed and transported using reliable and highly available systems, for example, to reduce a likelihood of a release event from occurring.

Each of the feedstocks 16, sub-reactor 26, and/or feed system 32 may use different operating parameters to create suitable output intermediate products for use in subsequent reactions or as a product output. Operating parameters of the reactor system 10 may include temperature, pressure, flow rate, mechanical agitation, product takeoff, component concentrations, polymer production rate, and so forth, and one or more may be selected on to achieve the desired polymer properties. Controlling temperature may include using a gas burner, an electrical heating conduit, a heat exchange device 28, or the like, to increase or reduce the temperature of intermediate products of the reactor system 10. As an example, during operation, a cooling fluid may be circulated within the cooling jackets of the heat exchange devices 68 as needed to remove the generated heat and to maintain the temperature within the desired range, such as between approximately 150° F. to 250° F. (65° C. to 121° C.) for polyethylene.

Figure 2:
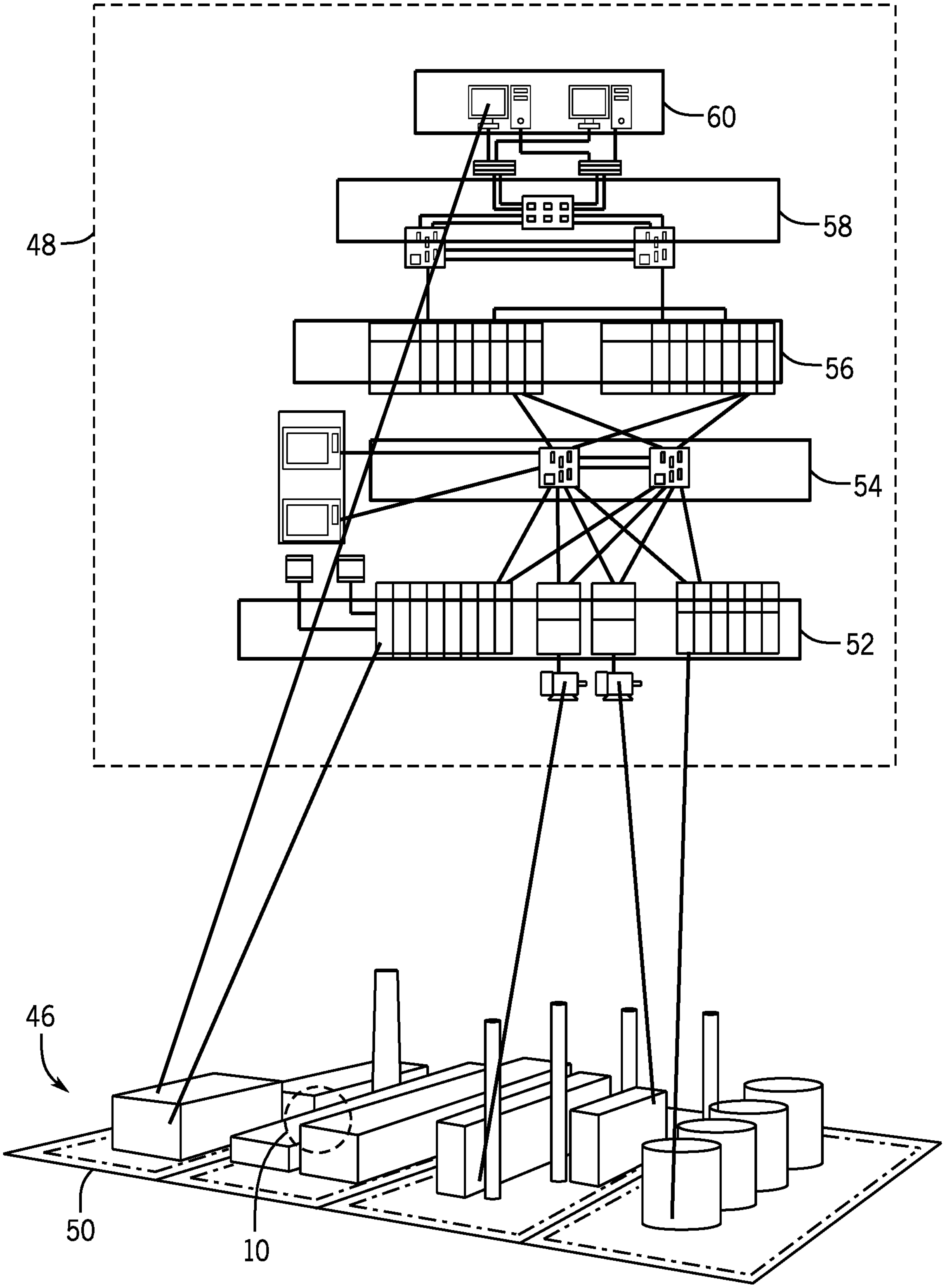
FIG. 2 is an illustration of an industrial automation system that includes a distributed control system (DCS), in accordance with an embodiment.

Feedstock 16 flow rates, control of operating parameters, and the like, may be managed by a control system (e.g., like the control system shown in FIG. 2). The control system may generate control signals, for example, control signals that are transmitted to one or more actuators 30 to cause the actuator to open or close (or partially open or partially close) as a way to control operating parameters of the feedstock 16, control of other operating parameters, and the like. Care may be taken when adjusting operating parameters since petrochemical manufacturing processing may be highly sensitive to erroneous operation. For example, fractions of a percentage of reliability change in a control system of the reactor system 10 may make a difference between a process being taken offline or a process working as expected.

With the foregoing in mind, the components of the reactor system 10 may be connected to power supplies, power supply conditions, and other systems that enable the components to be highly available. Moreover, it should be noted that the present embodiments described herein may be implemented in a variety of industrial environments and should not be limited to the reactor system 10 described above.

Referring now to FIG. 2, FIG. 2 is an illustration of an example industrial automation system 46 that includes a distributed control system 48 (e.g., a "DCS"). The industrial automation system 46 may include the reactor system 10 from FIG. 1 and/or any number of industrial automation components.

Industrial automation components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial automation components, the industrial automation components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, and the like. In one embodiment, every aspect of the industrial automation component may be controlled or operated by a single controller (e.g., control system). In another embodiment, the control and operation of each aspect of the industrial automation components may be distributed via multiple controllers (e.g., control system).

The industrial automation system 46 may divide logically and physically into different units 50 corresponding to cells, areas, factories, subsystems, or the like of the industrial automation system 46. The industrial automation components (e.g., load components, processing components) may be used within a unit 50 to perform various operations for the unit 50. The industrial automation components may be logically and/or physically divided into the units 50 as well to control performance of the various operations for the unit 50.

The distributed control system 48 may include computing devices with communication abilities, processing abilities, and the like. For example, the distributed control system 48 may include processing modules, a control system, a programmable logic controller (PLC), a programmable automation controller (PAC), or any other controller that may monitor, control, and operate an industrial automation device or component. The distributed control system 48 may be incorporated into any physical device (e.g., the industrial automation components) or may be implemented as a standalone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on.

In an example distributed control system 48, different hierarchical levels of devices may correspond to different operations. A first level 52 may include input/output communication modules (IO modules) to interface with industrial automation components in the unit 50. A second level 54 may include control systems that control components of the first level and/or enable intercommunication between components of the first level 52, even if not communicatively coupled in the first level 52. A third level 56 may include network components, such as network switches, that support availability of a mode of electronic communication between industrial automation components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may be a or a part of a closed loop control system (e.g., does not use feedback for control), an open loop control system (e.g., uses feedback for control), or may include a combination of both open and closed system components and/or algorithms. Further, in some embodiments, the distributed control system 48 may utilize feed forward inputs. For example, depending on information relating to the feedstocks 16 (e.g., compositional information relating to the catalyst 22 and/or the additional raw material 24, the distributed control system 48 may control the flow of any one or a combination of the feedstocks 16 into the sub-reactor 26, the reactor 14, or the like.

Each of the levels 52, 54, 56, 58, 60 may include component redundancies, which may help provide a high availability control system. For example, within the first level, redundant and concurrently operating backplanes may provide power to each of the IO modules.

Figure 3:
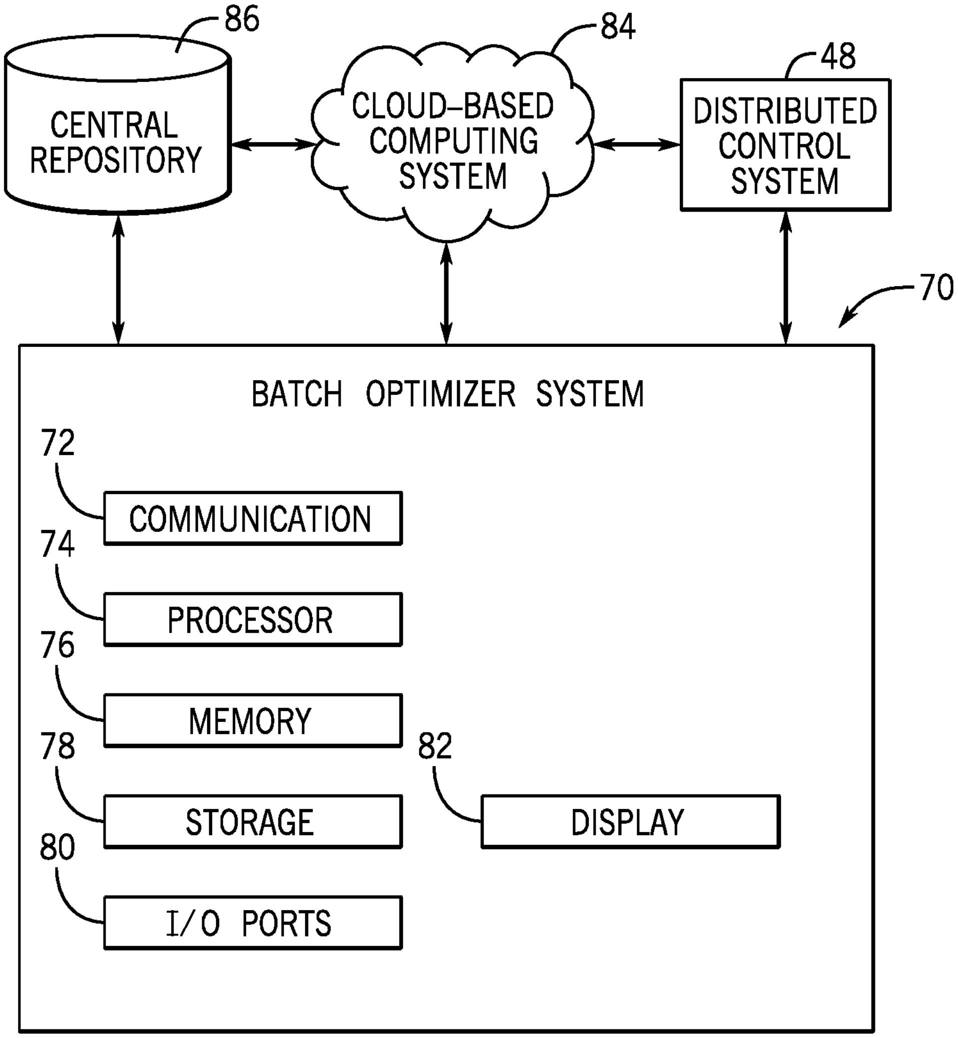
FIG. 3 is an illustration of a batch optimizer system, in accordance with an embodiment.

In any case, data collected from the distributed control system 48, stored in a central repository, or the like may be made available to a batch optimizer system 70. FIG. 3 illustrates example components that may be part of the batch optimizer system 70, in accordance with embodiments presented herein. For example, the batch optimizer system 70 may include a communication component 72, a processor 74, a memory 76, a storage 78, input/output (I/O) ports 80, a display 82, and the like. The communication component 72 may be a wireless or wired communication component that may facilitate communication between the industrial automation component that may be part of the distributed control system 48, a cloud-based computing system 84, a central repository 86 and other communication capable devices.

In some embodiments, the cloud-based computing system 84 may host a number of services via computing system resources that may be distributed over multiple locations. In this way, the various computing system resources may be scaled as needed to perform various operations. In some embodiments, the batch optimizer system 70 may be implemented via the cloud-based computing system 84, as a separate computing system, or both.

Further, datasets acquired via the industrial automation components, the distributed control system 48, or the like may be stored in the central repository 86. In addition, the simulated datasets acquired by digital twin systems that mirror or simulate the operations of an industrial automation system may be included in the central repository 86. In any case, the central repository 86 may include one or more databases or data structures for storing and querying datasets in a structured and efficient manner. In addition, the results of the root cause analysis operations performed by the batch optimizer system 70 and described herein may be stored in the central repository 86, such that previously performed analysis operations may be reviewed, modified, and redeployed for different datasets.

The processor 74 may be any type of computer processor or microprocessor capable of executing computer-executable code. The processor 74 may also include multiple processors that may perform the operations described below. The memory 76 and the storage 78 may be any suitable articles of manufacture that can serve as media to store processor-executable code, data, or the like. These articles of manufacture may represent computer-readable media (e.g., any suitable form of memory or storage) that may store the processor-executable code used by the processor 74 to perform the presently disclosed techniques. Generally, the processor 74 may execute software applications that include programs that enable a user to perform root cause analysis on accessible datasets to better ascertain issues or solutions to various discrepancies, anomalies, or the like. That is, the software applications may communicate with the batch optimizer system 70 may gather information associated with operations the industrial automation components via the sensors disposed on the industrial automation components and provide a user interface visualization to enable a user to perform different types of root cause analysis on the collected data.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 74 and may be used to monitor, control, access, or view one of the industrial automation components. As such, the batch optimizer system 70 may communicatively couple to industrial automation components or to a respective computing device of the industrial automation components via a direct connection between the devices, via the cloud-based computing system 84, or the like.

The I/O ports 80 may be interfaces that may couple to other peripheral components such as input devices (e.g., keyboard, mouse), sensors, input/output (I/O) modules, and the like. I/O modules may enable the batch optimizer system 70 to communicate with the industrial automation components or other devices in the industrial automation system via the I/O modules.

The display 82 may depict visualizations associated with software or executable code being processed by the processor 74. In one embodiment, the display 82 may be a touch display capable of receiving inputs from a user of the batch optimizer system 70. As such, the display 82 may serve as a user interface to provide parameters and instructions to guide the operation of the batch optimizer system 70. The display 82 may be used to display a graphical user interface (GUI) for operating the batch optimizer system 70. The display 82 may be any suitable type of display, such as a liquid crystal display (LCD), plasma display, or an organic light emitting diode (OLED) display, for example. Additionally, in one embodiment, the display 82 may be provided in conjunction with a touch-sensitive mechanism (e.g., a touch screen) that may function as part of a control interface for the industrial automation components to control the general operations of the system 10 or the like.

Although the components described above have been discussed with regard to the batch optimizer system 70, it should be noted that similar components may make up other computing devices described herein. Further, it should be noted that the listed components are provided as example components and the embodiments described herein are not to be limited to the components described with reference to FIG. 3.

With the foregoing in mind, in some embodiments the batch optimizer system 70 may enable users to store and retrieve reports from analyses performed in the past, such that the reports may be reused, revised, or applied to different datasets. In this way, there is a redundancy in reproducing the same reports in different locations (e.g., factories, facilities), at different times, or the like. By providing an organized platform to perform analyses and store the results of the analyses, the present embodiments may allow for a more efficient transfer of knowledge to the next generation of practitioners. Further, by storing the previously performed analyses, the batch optimizer system 70 may employ machine learning algorithms and artificial intelligence (AI) models to identify patterns that may allow the batch optimizer system 70 to more efficiently (e.g., time, computing resources) identify root causes for anomalous datasets, alarm conditions, and the like. Indeed, as IoT and connected enterprise datasets are increasingly available via storage components (e.g., databases), real-time access to industrial automation components, or the like, the batch optimizer system 70 may apply causal analysis functions and AI solutions, such that the batch optimizer system 70 may provide automated root causes analysis reports based on datasets that are outside an expected range, datasets that don't match expected datasets, and the like. Based on the analysis, the batch optimizer system 70 may proactively send commands to industrial automation components to adjust operations to resolve identified root cause issues and reduce downtime that may occur due to unplanned errors, issues, and the like. That is, the commands may include adjusting operations of various industrial automation components to reduce stress or increase likelihood of achieving target goals for target variables.

As mentioned above, the batch optimizer system 70 may generate one or more optimized time series datasets for various critical process parameters (CPPs) during the operations of an industrial automation system (e.g., reactor system 10) that performs certain batch operations. The optimized time series dataset may be characterized as a reference batch (G) that corresponds to desired operating parameters or properties of CPPs during the manufacturing or production of one or more products. After determining the optimized time series dataset, the batch optimizer system 70 may monitor CPPs and other properties of future batch productions to identify anomalies or potential issues in operations.

Figure 4:
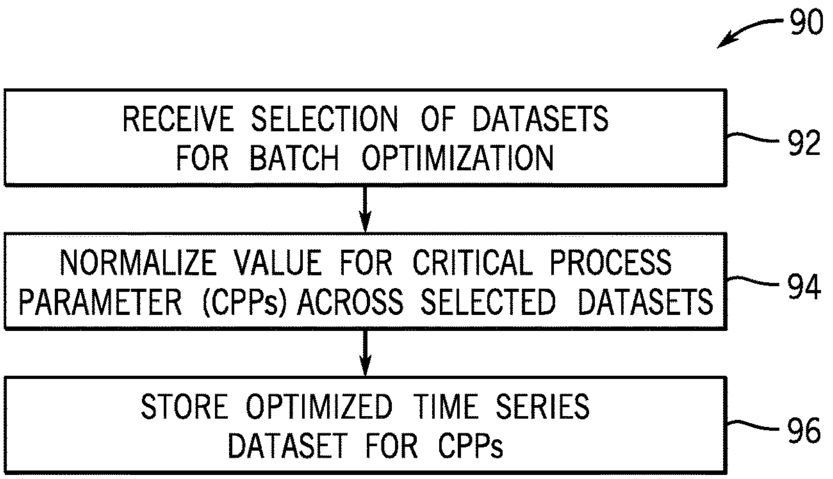
FIG. 4 is a flow chart of a method for generating optimized time series datasets for critical process parameters, in accordance with an embodiment.

With this in mind, FIG. 4 illustrates a method 90 for generating optimized (e.g., reference, golden) time series datasets for CPPs via the batch optimizer system 70. Although the following description of the method 90 is described as being performed by the batch optimizer system 70, it should be understood that the method 90 may be performed by any suitable computing system and in any suitable order.

Referring now to FIG. 4, at block 92, the batch optimizer system 70 may receive one or more selections of one or more datasets that the user classifies or designates as batches or operations that correspond to normal or expected operating conditions. The datasets may be stored on the central repository 86 or other suitable storage components. In some embodiments, the datasets may be real-time datasets acquired via the industrial components, the distributed control system 48, or the like.

For all selected batches under normal operational condition $$X_{i,k}^{(j)},$$

the batch optimizer system 70 may define the reference batch (G) for a critical process parameter $CPP_j$ as detailed below in Equation (1):

$$G_k^{(j)} = \frac{1}{I}\sum_{i=1}^{I} X_{i,k}^{(j)} \tag{1}$$

where i is a batch number, i=1, 2, . . . , I, k is sample time point, k=1, 2, . . . , K, $CPP_j$ is CPP variable, j=1, 2, . . . , J. The CPP may include any suitable type of parameter that may be measured, calculated, monitored, or the like. By way of example, for a batch operation, the CPP may include a sugar feed rate, an acid flow rate, a based flow rate, a heating/cooling water flow rate, a heating water flow rate, a water for injection/dilution amount, an air head pressure value, a dumped both flow rate, a substrate concentration level, a vessel volume amount, a vessel weight, a pH level, a temperature value, and the like.

At block 94, the batch optimizer system 70 may normalize values of the selected datasets received at block 92. In some embodiments, if the batch optimizer system 70 determines that the distribution of the reference time series $$G_k^{(j)},$$

k=1, 2, . . . , K, is similar to (e.g., within 90%) a normal distribution, the batch optimizer system 70 may determine a mean value μ and a standard deviation σ for the datasets and characterize the normalized reference batch for the critical process parameter $CPP_j$ as provided below in Equation (2).

$$G_k^{(j,norm)} = \frac{G_k^{(j)} - \mu}{\sigma} \tag{2}$$

where k is sample time point, k=1, 2, . . . , K, $CPP_j$ is CPP variable, j=1, 2, . . . , J.

If, however, the time series $$G_k^{(j)}$$

distribution deviates significantly (e.g., more than 90%) from a normal distribution, the batch optimizer system 70 may employ a min-max scaling algorithm as shown in Equation (3) below.

$$G_k^{(j,norm)} = \frac{G_k^{(j)} - \min\left(G_k^{(j)}\right)}{\max\left(G_k^{(j)}\right) - \min\left(G_k^{(j)}\right)} \tag{3}$$

where k is sample time point, k=1, 2, . . . , K, $CPP_j$ is CPP variable, j=1, 2, . . . , J, and the minimum and maximum are with respect to the variable k.

In some embodiments, the batch optimizer system 70 may use other techniques or algorithms to normalize the datasets. Indeed, the batch optimizer system 70 may determine an average value for the time series dataset or perform some other calculation to later compare to other datasets. For instance, for each CPP, the batch optimizer system 70 may determine an average value across the datasets that correspond to the selected batches under normal operating conditions to generate the reference batch time series datasets.

At block 96, the batch optimizer system 70 may store the normalized time series datasets $$G_k^{(j,norm)}$$

as the reference batch (G). The normalized time series datasets $$G_k^{(j,norm)}$$

may be stored in the central repository 86 in a consistent manner, such that users may retrieve the analysis to assist in evaluating other anomalies. In this way, the batch optimizer system 70 may compare other datasets (e.g., acquired in the future) to the reference batch (G) to identify anomalies, determine commands to adjust operations to industrial automation components, perform root cause analyses, and the like.

After determining the normalized or reference time series datasets $$G_k^{(j,norm)},$$

the bath optimizer system 70 may monitor future measurements and datasets to determine whether any deviations or discrepancies exists between the newly acquired datasets and the reference time series datasets $$G_k^{(j,norm)}.$$

In this way, the batch optimizer system 70 may efficiently detect anomalies or issues that may cause the resulting product to be different than the product produced during the reference batch operations. Moreover, feedback data may be received or determined (e.g., via machine learning, artificial intelligence models, user input) to provide insight regarding processes or operational changes to implement to achieve results that correspond to the reference batch (G).

It should be noted that in addition to performing the techniques described above and below may be implemented with respect to critical quality attributes (CQAs) as described herein as being performed with respect to CPPs. That is, the batch optimizer system 70 may normalize values for critical quality attributes (CQAs) across selected datasets, generate optimized time series datasets for the CQAs, and store the optimized time series datasets for CQAs as described herein. In this way, the reference batch may be determined based on the CQAs. CQAs may include physical, chemical, biological, or microbiological property or characteristics that should be within an appropriate limit, range, or distribution to ensure a desired product quality. By way of example, CQAs may include measurements related to variants of the product, such as size, charge, glycans, or oxidation; process-related impurities, such as host cell protein, DNA, or leachables, regulatory CQAs, such as composition and strength (e.g., pH, excipients, quantity/concentration, osmolality) or adventitious agents (potential viruses, bioburden, mycoplasma, endotoxin), and the like.

Figure 5:
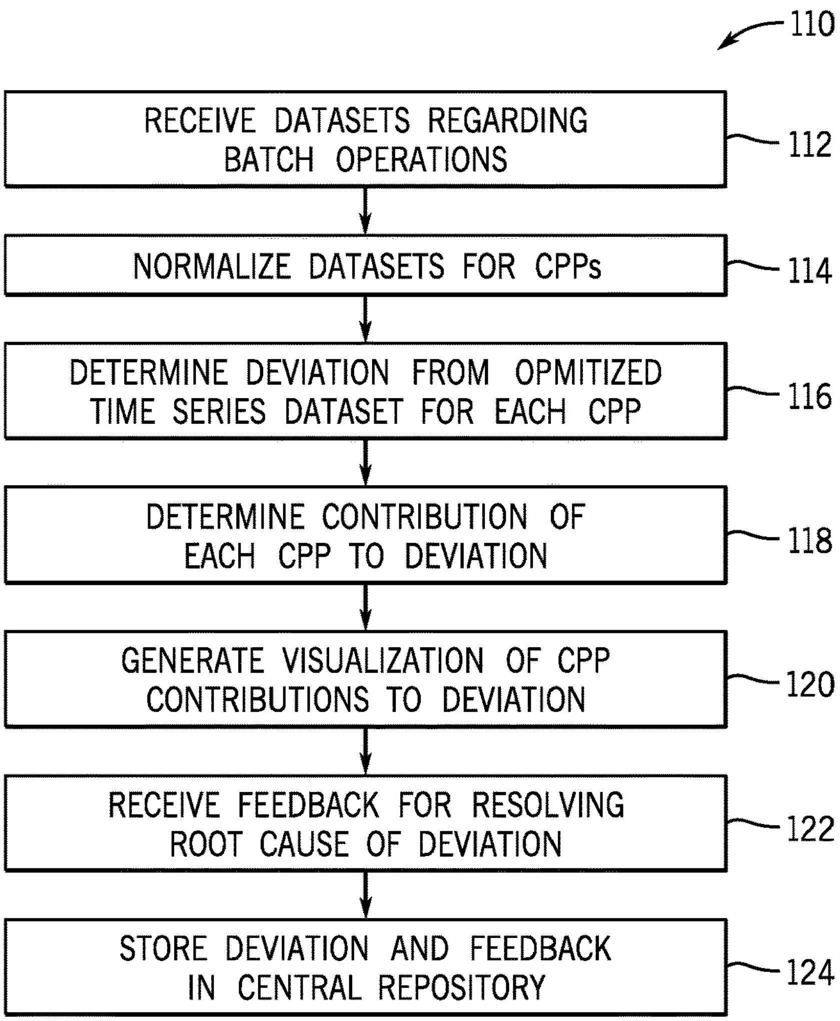
FIG. 5 is a flow chart of a method for employing optimized time series datasets for critical process parameters to perform root cause analyses, in accordance with an embodiment.

With this in mind, FIG. 5 illustrates a method 110 for performing root cause analysis operations via the batch optimizer system 70 in accordance with embodiments described herein. Although the following description of the method 110 is described as being performed by the batch optimizer system 70, it should be understood that the method 110 may be performed by any suitable computing system and in any suitable order.

Referring now to FIG. 5, at block 112, the batch optimizer system 70 may receive a selection of one or more datasets (X) regarding batch operations. The datasets may be selected from those stored in the central repository 86 or other suitable storage. In some embodiments, the datasets may be related to real-time data provided by the industrial automation components or the like.

At block 114, the batch optimizer system 70 may normalize the received datasets $$X_k^{(j)}$$

as described above with reference to block 94 of FIG. 4. As such, for a selected batch or dataset related to the selected batch and the critical process parameter $CPP_j$, if the time series $$X_k^{(j)},$$

k=1, 2, . . . , K distribution is similar to normal distribution, the batch optimizer system 70 may determine a mean value μ of the respective dataset and a standard deviation σ of the respective datasets. These values may then be used to determine a normalized dataset for the selected batch (X) as detailed below with reference to Equation (4) below:

$$X_k^{(j,norm)} = \frac{x_k^{(j)} - \mu}{\sigma} \tag{4}$$

where k is a sample time point, k=1, 2, . . . , K, j is for $CPP_j$ variable, j=1, 2, . . . , J.

If, however, the time series $$X_{j,k}^{(i)}$$

distribution deviates (e.g., greater than 90%) g from a normal distribution, we will employ a min-max scaling algorithm as detailed below in Equation (5).

$$X_k^{(j,norm)} = \frac{X_k^{(j)} - \min(X_k^{(j)})}{\max(X_k^{(j)}) - \min(X_k^{(j)})} \tag{5}$$

where the minimum and maximum are with respect to the k. As mentioned above, the batch optimizer system 70 may normalize the received dataset or perform other calculations on the received datasets to perform the comparison operations described below.

Figure 6:
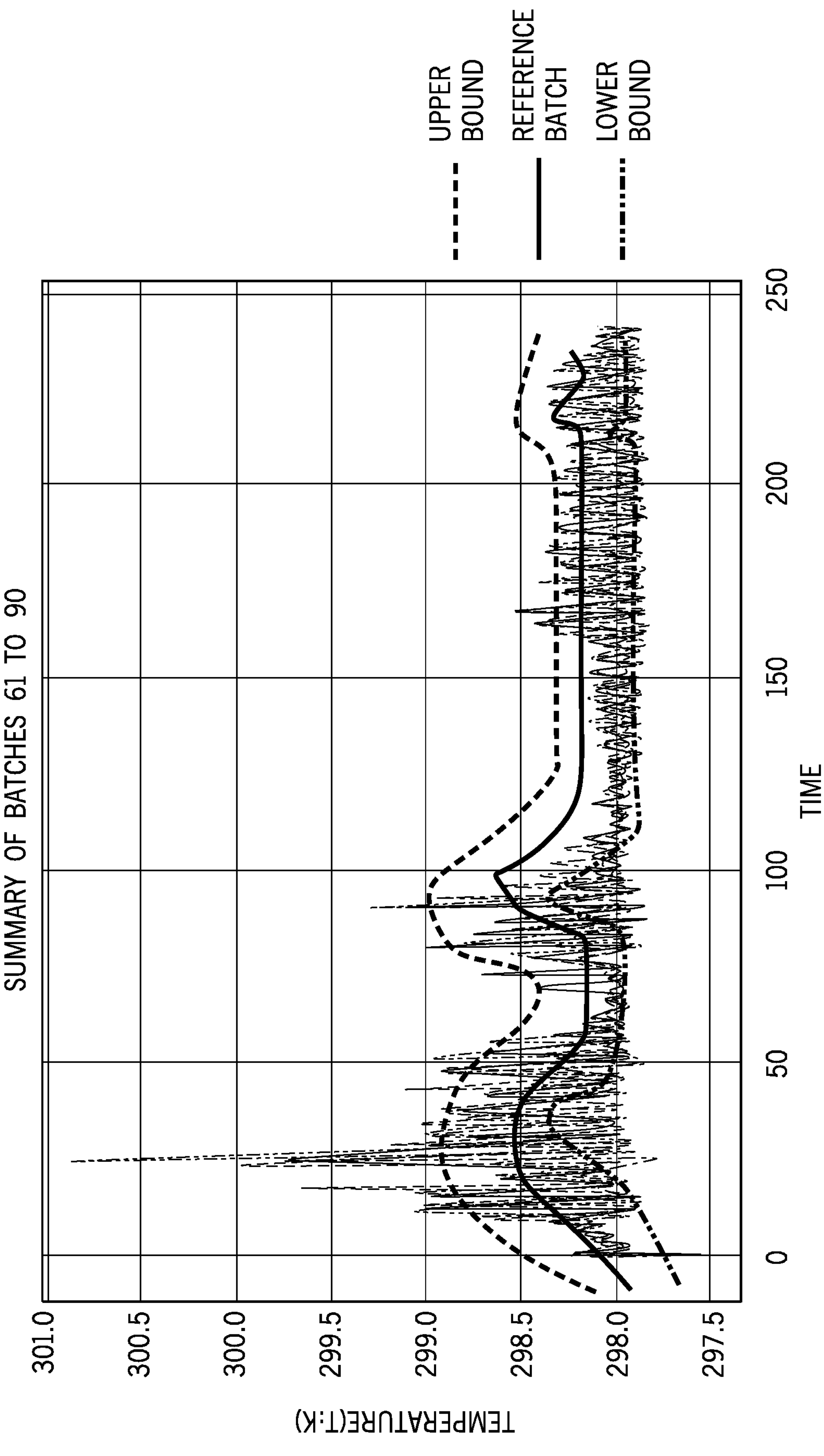
FIG. 6 is an example visualization of upper and lower bounds of optimized datasets, in accordance with an embodiment.

At block 116, the batch optimizer system 70 may determine a deviation between the normalized time series $$X_k^{(j,norm)}$$

and the normalized reference time series $$G_k^{(j,norm)}$$

for each respective $CPP_j$. The deviation may correspond to an upper bound limit (e.g., $\mu_t+3\sigma_t$) and a lower bound limit ($\mu_t-3\sigma_t$) relative to the normalized reference time series $$G_k^{(j,norm)},$$

an average value for the time series dataset, or the like. By way of example, FIG. 6 illustrates an example visualization of a time series dataset of temperature for a number of batches. The reference t batch dataset may correspond to the normalized reference time series $$G_k^{(j,norm)},$$

the average value for the dataset, or the like.

To conserve processing power, in some embodiments, the batch optimizer system 70 may determine the deviation between the two datasets after detecting an alarm, an instance in which a critical quality attribute (CQA) is out of a range or specification, or the like. That is, after receiving an indication of an alarm or anomaly, the batch optimizer system 70 may receive the datasets relative to the operation and determine the deviation of the CPPs of the selected batch with the reference batch. In some embodiments, the batch optimizer system 70 may determine an adjusted symmetric mean absolute percentage error (ASMAPE) for each $CPP_j$ to measure the deviation from the reference batch according to Equation (6) below.

$$ASMAPE(j) = \frac{1}{n}\sum_{k=1}^{K} \frac{\left|X_k^{(j,norm)} - G_k^{(j,norm)}\right|}{\left|X_k^{(j,norm)}\right| + \left|G_k^{(j,norm)}\right|} \quad (6)$$

where $$X_k^{(j,norm)}$$

is a received batch at a sample data point k for $CPP_j$ after normalization and $$G_k^{(j,norm)}$$

is the reference batch at a sample data point k for $CPP_j$ after normalization, as described above. It should be noted that if $$X_k^{(j,norm)} = 0$$

and $$G_k^{(j,norm)} = 0,$$

the batch optimizer system 70 may skip the item in the sum definition of Equation (6). Further, it should be noted that the ASMAPE(j) is in interval [0,1].

After determining the deviation of each $CPP_j$ between the received dataset and the reference dataset, at block 118, the batch optimizer system 70 may determine a contribution for each $CPP_j$ to the deviation. As such, the contribution of each $CPP_j$ to the deviation may be determine based on Equation (7) below.

$$\text{Contribution}(j) = \frac{ASMAPE(j)}{\sum_{j=1}^{J} ASMAPE(j)} \quad (7)$$

Figure 7:
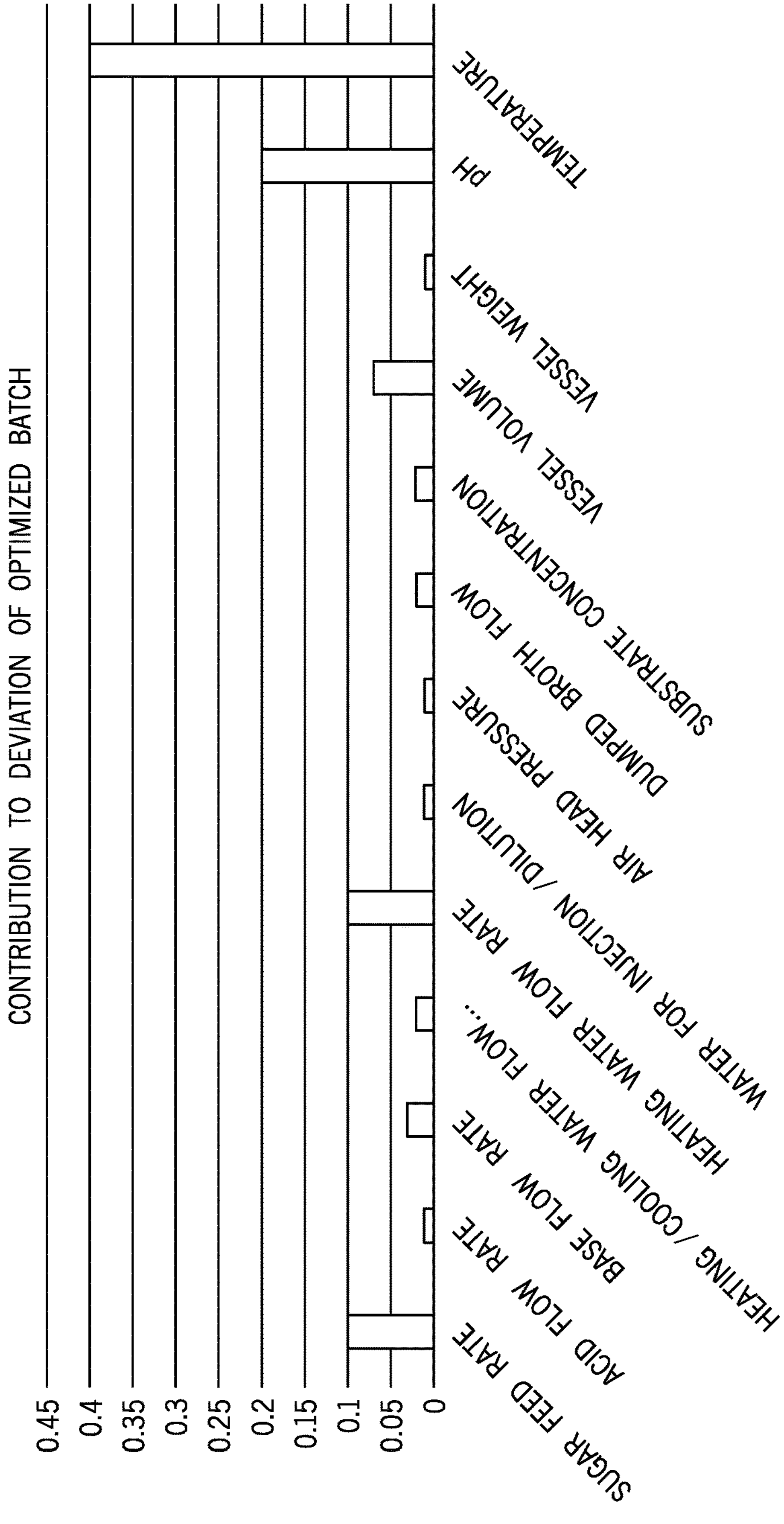
FIG. 7 is an example visualization of contributions to deviations in datasets as compared to optimized time series datasets, in accordance with an embodiment.

In some embodiments, at block 120, the batch optimizer system 70 may generate a visualization representative of the contribution of each $CPP_j$ to the deviation. For example, FIG. 7 illustrates an example bar graph representing the contribution of each $CPP_j$ to the deviation. The deviations and contributions to the deviations visualized in FIGS. 6 and 7 may assist operators and engineer in addressing root cause issues to resolve anomalies in the respective batches as compared to the reference batch. As mentioned above, the reference batch may be determined in the same manner as described herein for critical quality attributes (CQAs).

Indeed, at block 122, the batch optimizer system 70 may receive feedback for resolving a root cause of the deviation. As such, the batch optimizer system 70 may receive a user input that provides an indication of a root cause for the respective CPPj, an indication of a resolution (e.g., commands to industrial automation components) for the respective CPPj, and the like. In addition, the batch optimizer system 70 may perform automatic root cause analysis to determine commands to send to the industrial automation components to adjust operations and achieve the reference batch operating conditions. In some embodiments, the batch optimizer system 70 may perform root cause analysis using techniques such as those described in U.S. patent application Ser. No. 18/503,898, entitled "Root Cause Analysis Framework in Industrial Process Analytics," which is incorporated herein for all purposes.

In some embodiments, the batch optimizer system 70 may receive an input via the visualization depicted at FIGS. 6 and 7 or other suitable output provided by the batch optimizer system 70. After receiving the input, the batch optimizer system 70 may provide drill down details, data mining details, auto-anomaly detection data, or the like. That is, the batch optimizer system 70 may retrieve more granular or tangential datasets from the central repository 86 or the like. After the user investigates the respective CPPj, the user may perform additional analysis as described in the U.S. patent application Ser. No. 18/503,898, entitled "Root Cause Analysis Framework in Industrial Process Analytics," described above.

After receiving the information for the deviation and resolving the root causes of deviation, the batch optimizer system 70 may, at block 124, store the information in the central repository 86 or other suitable storage component. In this way, the batch optimizer system 70 may provide information that may be used as a knowledge base for future reference related to similar deviations identified in other datasets. In addition, the stored datasets may be used as an input or knowledge base for generative artificial intelligence (AI) feedback, tools, or the like.

In some embodiments, the batch optimizer system 70 may generate commands for industrial automation components to resolve the deviations, the identified root causes, and the like. In this way, the batch optimizer system 70 may automatically detect and resolve anomalies based on the embodiments described herein. Further, the datasets, feedback, root causes, and the like determined using the embodiments described herein may be employed to provide generative AI responses and feedback for future users.

Figure 8:
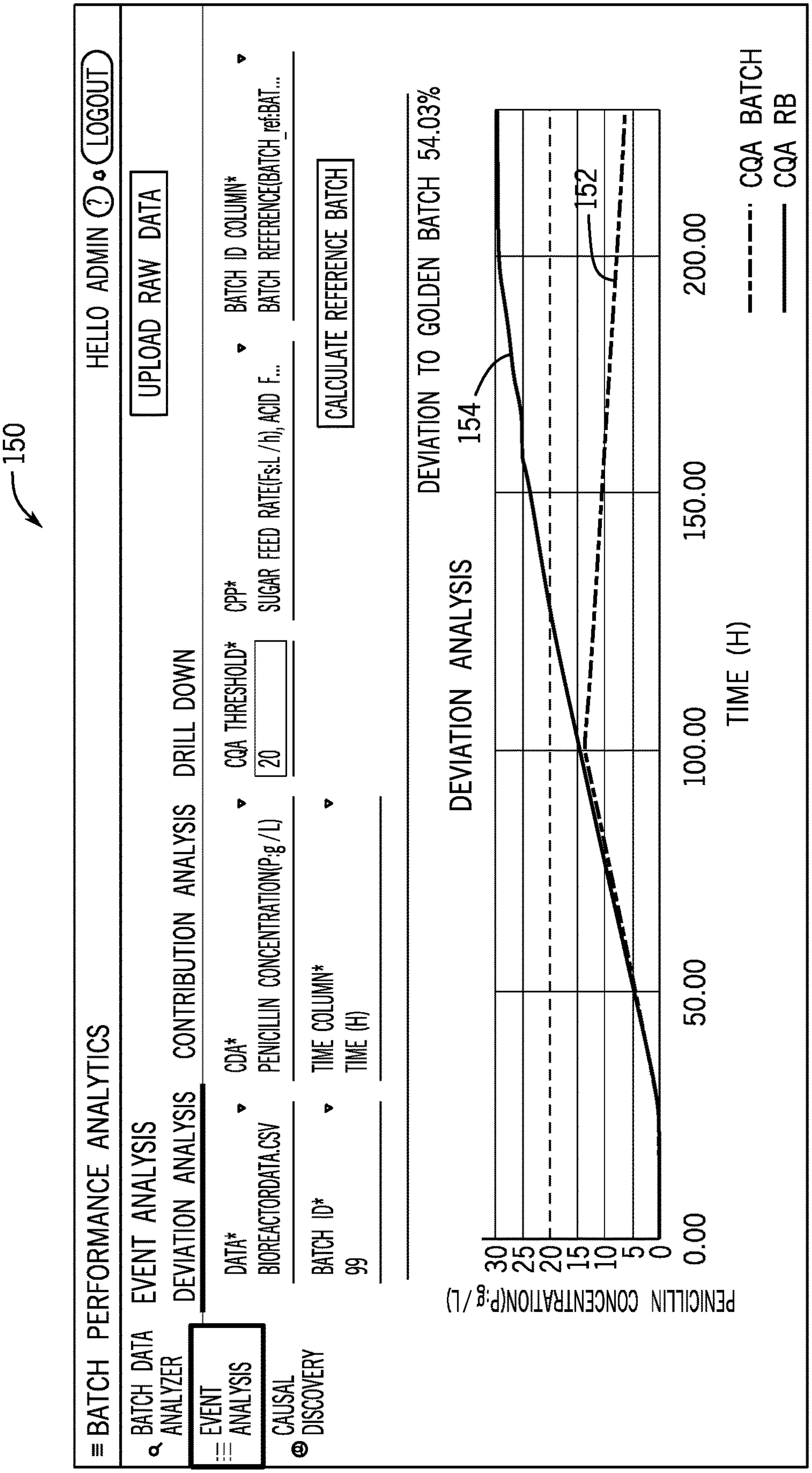
FIG. 8 is an example user interface for implementing batch optimizer system, in accordance with an embodiment.

With this in mind, FIG. 8 illustrates an example graphical user interface that may be employed by the batch optimizer system 70 to present a visualization 150 for performing the embodiments herein. By way of example, the batch optimizer system 70 may receive a selection of an event analysis input component and select a deviation analysis view. Then, the user may choose a dataset and a CQA (critical quality attribute) to evaluate. Next, the batch optimizer system 70 may receive a selection of a CQA threshold, which may characterize a batch as either acceptable (e.g., CQA>=CQA threshold) or not (e.g., CQA<CQA threshold). In some embodiments, the batch optimizer system 70 may allow the user to select a batch ID column, a batch ID (e.g., 99), and a time column. Based on these inputs, the batch optimizer system 70 may determine a reference batch dataset as described above. The batch optimizer system 70 may present the selected batch dataset 152 relative to the reference batch dataset 154 as illustrated in the visualization 150.

Figure 9:
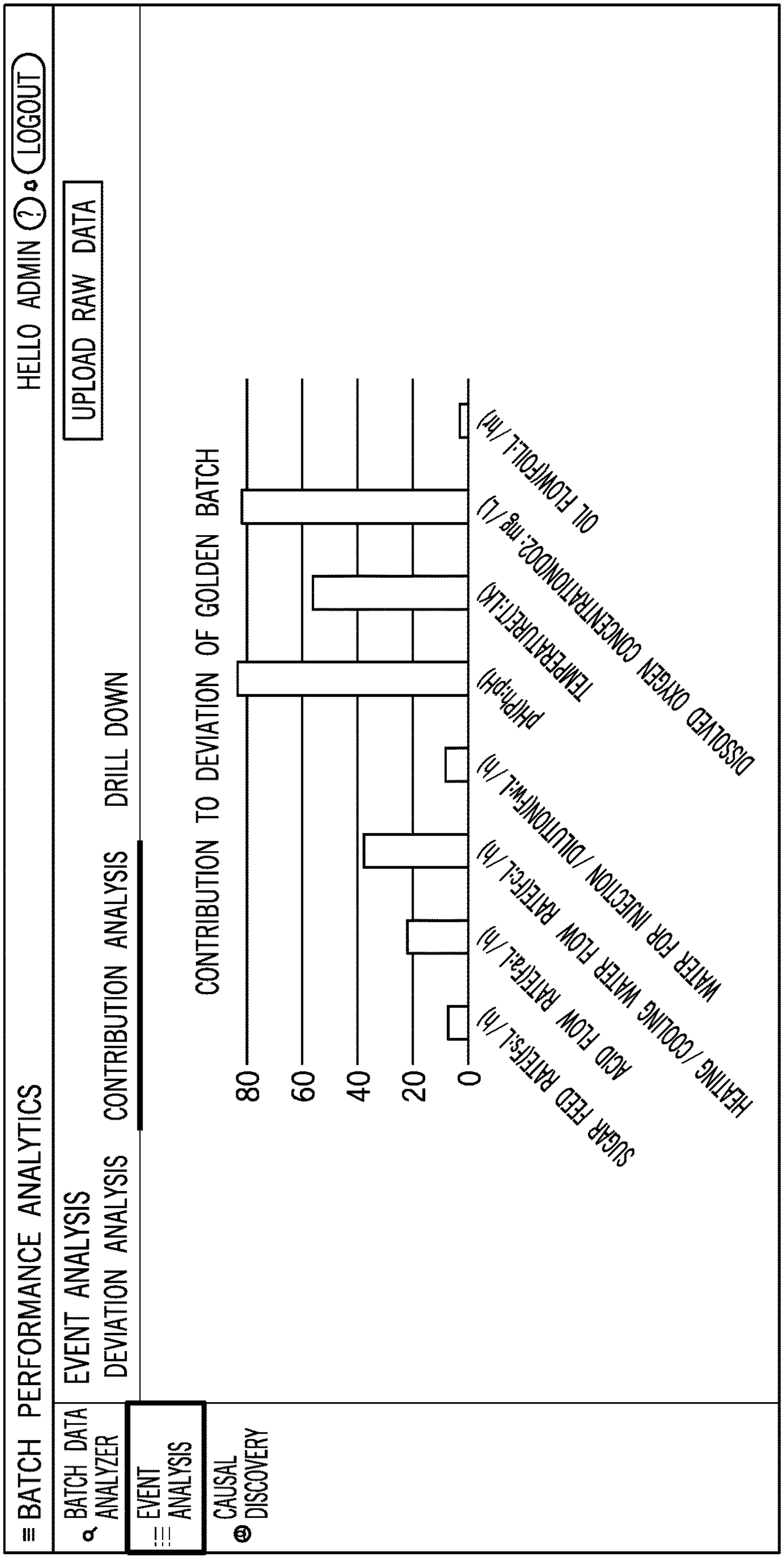
FIG. 9 is an example visualization for presenting contributions of CPPs of the deviations, in accordance with an embodiment.
Figure 10:
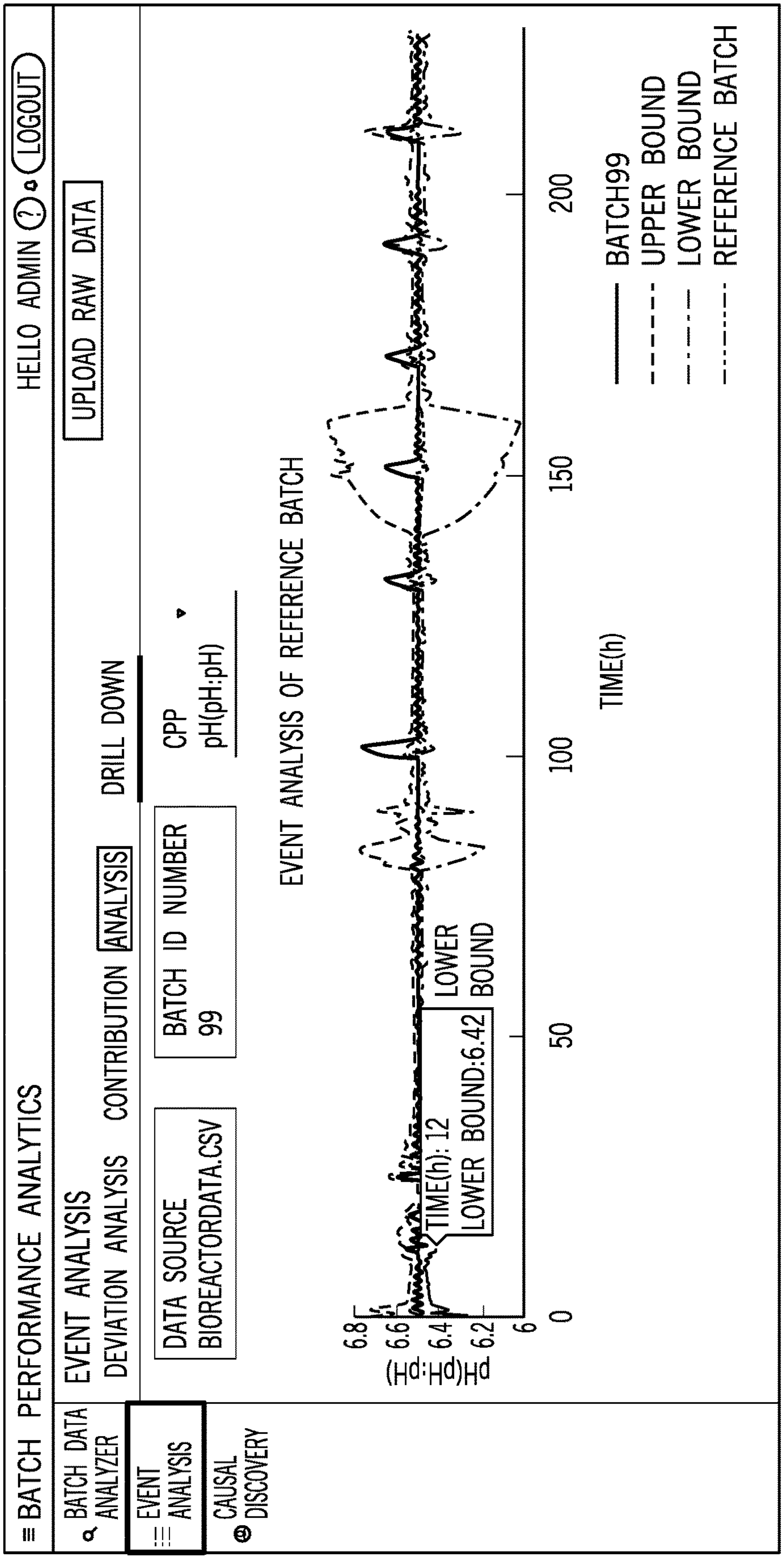
FIG. 10 is an example visualization of a dataset with upper and lower bounds, in accordance with an embodiment.

After determining the reference batch, the batch optimizer system 70 may detect deviations as described above and present a contribution analysis visualization as depicted in FIG. 9. As shown in FIG. 9, the CPPs for pH, Temperature, and DO2 are identified as the top three CPPs with deviations from their reference batches. After receiving inputs on the pH visualization component of FIG. 9, the batch optimizer system 70 may present a drill down view as depicted in FIG. 10. As shown in FIG. 10, the pH chart includes a spike at around 100 hours, which may correspond to one of the causes of the CQA starting to deviate from the reference batch at that time and subsequently going out of specification (OOS). The user may modify the CPP to evaluate and analyze the resulting dataset in the same manner to determine root causes for the deviation or the like. In this way, the batch optimizer system 70 may allow users to determine whether a batch is acceptable based on the CQA threshold and compare it with the reference batch. Further, the user may retrieve additional information related to the batch and utilize contribution analysis to identify the top contributing CPPs and conduct a detailed investigation to ascertain when, where, and how the root cause occurred, and how these CPP factors influenced the CQA to go out of specification.

By performing the embodiments described herein, the batch optimizer system 70 may provide improved manufacturing operations in batch operations. That is, by continuously monitoring the batch datasets and comparing the acquired datasets to the reference dataset, the embodiments described herein may provide for reduced costs for operations through improved yield and resource utilization, and reduced waste and downtime. That is, the batch optimizer system 70 may automatically adjust operations or identify deviations to alert users in an efficient manner to ensure that current operations match the quality and results of the reference batch operations. As a result, the manufacturing process provides increase in revenue through enhanced product quality and manufacturing consistency, leading to market differentiation. Moreover, implementing the embodiments described herein provide for decreased lead times to produce quality products that match reference batch properties. Further, since the batch optimizer system 70 may be communicatively coupled to the industrial automation devices, the embodiments described herein provide for ease of implementation and continuous improvement in operations. In addition, the datasets collected in accordance with the embodiments described herein may be utilized for laying a foundation for data-driven operating procedures, shift from reactionary to preventative analytics using historical data to identify ideal manufacturing conditions, and providing generative AI background datasets for users. Further, the processes described herein may also be employed to determine solutions for identified root causes that may involve sending commands, via the batch optimizer system 70, to industrial automation components, the distributed control system 48, and the like to modify operations and resolve root cause issues or limit the effects of the identified issues.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

receiving, via a processing system, a selection of a first dataset associated with one or more operations of one or more industrial automation components of an industrial system configured to perform a first batch operation, wherein the first dataset comprises first time series data for one or more first operating parameters indicative of normal operating conditions of the one or more operations of the one or more industrial automation components, and wherein the one or more first operating parameters comprise at least a flow rate of an actuator;

generating, via the processing system, a reference batch dataset based on a normalization of the first time series data;

receiving, via the processing system, a second dataset comprising second time series data associated with one or more second operating parameters of a second batch operation, wherein the one or more first operating parameters correspond to the one or more second operating parameters;

determining, via the processing system, one or more deviations between the reference batch dataset and the second time series data;

determining, via the processing system, a contribution of each operating parameter of the one or more second operating parameters of the second dataset to the one or more deviations based on a ratio of a deviation metric for each operating parameter of the one or more second operating parameters to a sum of deviation metrics for the one or more second operating parameters;

generating, via the processing system, a visualization representative of the contribution of each operating parameter of the one or more second operating parameters to the one or more deviations;

receiving, via the processing system, feedback associated with at least one of the one or more second operating parameters;

generating, via the processing system, one or more commands for the one or more industrial automation components based on the feedback; and sending, via the processing system, the one or more commands to the one or more industrial automation components, wherein the one or more commands, when executed by a controller of the industrial system, comprise adjusting the flow rate of the actuator.

2. The method of claim 1, comprising receiving the feedback via a user input.

3. The method of claim 1, wherein the reference batch dataset corresponds to a normal distribution that is normalized based on a mean of the first time series data and a standard deviation of the first time series data.

4. The method of claim 3, wherein the reference batch dataset is normalized based on a minimum and a maximum of the first time series data in response to the first time series data deviating from the normal distribution.

5. The method of claim 1, wherein the contribution of each operating parameter of the one or more second operating parameters to the one or more deviations is determined based on an adjusted symmetric mean absolute percentage.

6. The method of claim 1, wherein the one or more first operating parameters comprise a feed rate, a pH level, a temperature value, a concentration level, or any combination thereof.

7. The method of claim 1, wherein the first time series data corresponds to one or more quality parameters associated with one or more products of the first batch operation.

8. A non-transitory computer-readable medium comprising computer-executable instructions that, when executed, are configured to cause a processing system to perform operations comprising:

receiving a selection of a first dataset associated with one or more operations of one or more industrial automation components of an industrial system configured to perform a first batch operation, wherein the first dataset comprises first time series data for one or more first operating parameters indicative of normal operating conditions of the one or more operations of the one or more industrial automation components, and wherein the one or more first operating parameters comprise at least a flow rate of an actuator;

generating a reference batch dataset based on a normalization of the first time series data;

receiving a second dataset comprising second time series data associated with one or more second operating parameters of a second batch operation, wherein the one or more first operating parameters correspond to the one or more second operating parameters;

determining one or more deviations between the reference batch dataset and the second time series data;

determining a contribution of each operating parameter of the one or more second operating parameters of the second dataset to the one or more deviations based on a ratio of a deviation metric for each operating parameter of the one or more second operating parameters to a sum of deviation metrics for the one or more second operating parameters;

generating a visualization representative of the contribution of each operating parameter of the one or more second operating parameters to the one or more deviations;

receiving feedback associated with at least one of the one or more second operating parameters;

generating one or more commands for the one or more industrial automation components based on the feedback; and sending the one or more commands to the one or more industrial automation components, wherein the one or more commands, when executed by a controller of the industrial system, comprise adjusting the flow rate of the actuator.

9. The non-transitory computer-readable medium of claim 8, wherein the operations comprise receiving the feedback via a user input.

10. The non-transitory computer-readable medium of claim 8, wherein the reference batch dataset corresponds to a normal distribution that is normalized based on a mean of the first time series data and a standard deviation of the first time series data.

11. The non-transitory computer-readable medium of claim 10, wherein the reference batch dataset is normalized based on a minimum and a maximum of the first time series data in response to the first time series data-deviating from the normal distribution.

12. The non-transitory computer-readable medium of claim 8, wherein the contribution of each operating parameter of the one or more second operating parameters to the one or more deviations is determined based on an adjusted symmetric mean absolute percentage.

13. The non-transitory computer-readable medium of claim 8, wherein the one or more first operating parameters comprise a feed rate, a pH level, a temperature value, a concentration level, or any combination thereof.

14. The non-transitory computer-readable medium of claim 8, wherein the first time series data corresponds to one or more quality parameters associated with one or more products of the first batch operation.

15. A system, comprising:

one or more industrial automation components of an industrial system configured to perform a batch operation; and a processing system configured to perform operations comprising:

receiving a selection of a first dataset associated with one or more operations of one or more industrial automation components of an industrial system configured to perform a first batch operation, wherein the first dataset comprises first time series data for one or more first operating parameters indicative of normal operating conditions of the one or more operations of the one or more industrial automation components, and wherein the one or more first operating parameters comprise at least a flow rate of an actuator;

generating a reference batch dataset based on a normalization of the first time series data;

receiving a second dataset comprising second time series data associated with one or more second operating parameters of a second batch operation, wherein the one or more first operating parameters correspond to the one or more second operating parameters;

determining one or more deviations between the reference batch dataset and the second time series data;

determining a contribution of each operating parameter of the one or more second operating parameters of the second dataset to the one or more deviations based on a ratio of a deviation metric for each operating parameter of the one or more second operating parameters to a sum of deviation metrics for the one or more second operating parameters;

generating a visualization representative of the contribution of each operating parameter of the one or more second operating parameters to the one or more deviations;

receiving feedback associated with at least one of the one or more second operating parameters;

generating one or more commands for the one or more industrial automation components based on the feedback; and sending the one or more commands to the one or more industrial automation components, wherein the one or more commands, when executed by a controller of the industrial system, comprise adjusting the flow rate of the actuator.

16. The system of claim 15, wherein the operations comprise receiving the feedback via a user input.

17. The system of claim 15, wherein the reference batch dataset corresponds to a normal distribution that is normalized based on a mean of the first time series data and a standard deviation of the first time series data.

18. The system of claim 17, wherein the reference batch dataset is normalized based on a minimum and a maximum of the first time series data in response to the first time series data deviating from the normal distribution.

19. The system of claim 15, wherein the one or more first operating parameters comprise a feed rate, a pH level, a temperature value, a concentration level, or any combination thereof.

20. The system of claim 15, wherein the first time series data corresponds to one or more quality parameters associated with one or more products of the first batch operation.

* * * * *